US010240046B2

(12) United States Patent
Al-Ghamdi et al.

(10) Patent No.: US 10,240,046 B2
(45) Date of Patent: Mar. 26, 2019

(54) METHOD FOR FABRICATION OF A HYBRID DUAL PHASE FILLER FOR ELASTOMERS

(71) Applicant: King Abdulaziz University, Jeddah (SA)

(72) Inventors: Ahmed A. Al-Ghamdi, Jeddah (SA); Omar A. Al-Hartomy, Jeddah (SA); Falleh R. Al-Solamy, Jeddah (SA); Nikolay Todorov Dishovsky, Sofia (BG); Petrunka Atanasova Malinova, Sofia (BG); Mihail Tsetskov Mihaylov, Lom (BG)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 43 days.

(21) Appl. No.: 15/203,398

(22) Filed: Jul. 6, 2016

(65) Prior Publication Data

US 2017/0218205 A1    Aug. 3, 2017

(30) Foreign Application Priority Data

Jan. 28, 2016  (BG) .......................... 112205

(51) Int. Cl.
  *C09C 1/56*   (2006.01)
  *C09C 1/22*   (2006.01)
  *C09C 1/24*   (2006.01)

(52) U.S. Cl.
  CPC ............... *C09C 1/56* (2013.01); *C09C 1/24* (2013.01); *C01P 2006/12* (2013.01); *C01P 2006/14* (2013.01)

(58) Field of Classification Search
  None
  See application file for complete search history.

(56) References Cited

U.S. PATENT DOCUMENTS 4,155,883 A * 5/1979 Oguchi .............. G03G 9/08793
                                                          428/407
6,294,242 B1 * 9/2001 Hayashi ................ B82Y 30/00
                                                          428/328

(Continued)

FOREIGN PATENT DOCUMENTS

CN    101863668 A  * 10/2010
CN    103055813 A     4/2013

(Continued)

OTHER PUBLICATIONS

Al-Ghamdi, Ahmed et al. "Conductive carbon black/magnetite hybrid fillers in microwave absorbing composites based on natural rubber" Composites Part B 96 (Apr. 4, 2016) pp. 231-241.*

(Continued)

*Primary Examiner* — Colleen P Dunn
*Assistant Examiner* — Ross J Christie
(74) *Attorney, Agent, or Firm* — Birch, Stewart, Kolasch & Birch, LLP

(57) ABSTRACT

The method for fabricating a hybrid dual phase filler for elastomers includes: impregnation of carbon black with ethanol suspension of magnetite in a ball mill; drying of the dual phase mixture till constant weight; grinding of the dried product in a ball mill; thermal activation under vacuum in a specifically designed reactor followed by a grinding of the final product in a ball mill. The hybrid dual phase filler includes carbon black impregnated with ethanol suspension of magnetite, contains 5 to 50 mass % of magnetite and 95 to 50 mass % of carbon black. Magnetite is a powder and includes up to 5% of $SiO_2$, particle size up to 50μ and density of 4.8-5.2 $g/cm^3$ with a specific surface area (BET/) 400-900 $m^2/g$; iodine number—370-750 mg/g; oil number 200-450 ml/100 g; total volume pore 0.5-1.5 $cm^3$(STP)/g;

(Continued)

micropore surface area 50-90 m²/g; external specific surface area 400-900 m²/g.

4 Claims, 8 Drawing Sheets

(56) References Cited

U.S. PATENT DOCUMENTS

| | | | |
|---|---|---|---|
| 6,379,855 B1 * | 4/2002 | Hayashi | C07C 25/24 428/405 |
| 6,416,864 B1 * | 7/2002 | Hayashi | G03G 9/083 428/403 |
| 6,767,611 B2 * | 7/2004 | Hayashi | G11B 5/712 428/328 |
| 2001/0012574 A1 * | 8/2001 | Matsubayashi | G11B 5/70689 428/845.2 |
| 2005/0096418 A1 | 5/2005 | Baranek | |

FOREIGN PATENT DOCUMENTS

| | | | |
|---|---|---|---|
| EP | 1102245 A1 * | 5/2001 | ............ B82Y 30/00 |
| FR | 2920918 A1 | 3/2009 | |
| GB | 2 261 436 A | 5/1993 | |
| JP | 10-204305 A | 8/1998 | |

OTHER PUBLICATIONS

Shtarkova, R. and N. Dishovsky. "Elastomer-based Microwave Absorbing Materials" Journal of Elastomers and Plastics vol. 41 (Mar. 2009) pp. 163-174.*

Dishovsky, N. "Rubber Based Composites with Active Behavior to Microwaves (Review)" Journal of the University of Chemical Technology and Metallurgy vol. 44 (2) (Apr. 30, 2009) pp. 115-122.*

Specification of Magnetite commercially available from Inoxia Ltd. https://www.inoxia.co.uk/products/chemicals/inorganic-compounds/magnetite-powder.*

* cited by examiner

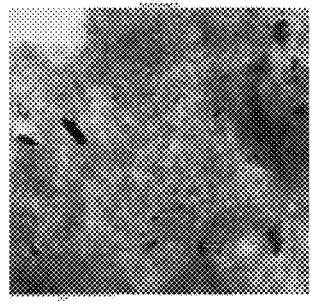
Figure 2(a)
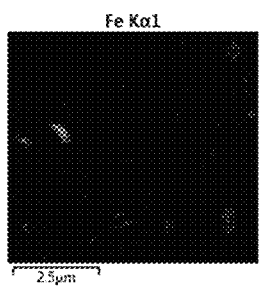 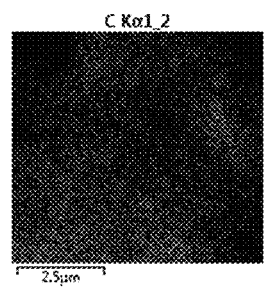 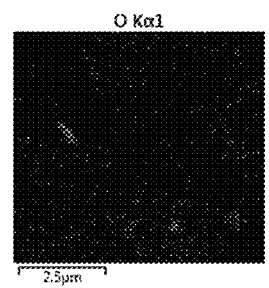
Figure 2(b)            Figure 2(c)            Figure 2(d)

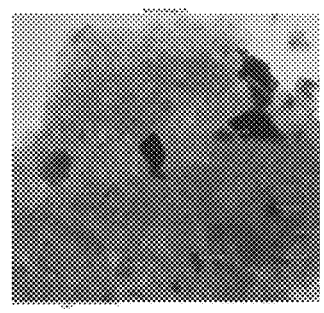
Figure 3(a)
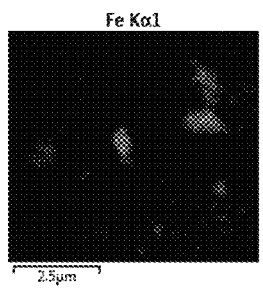 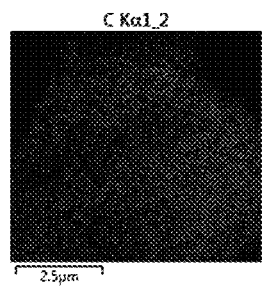 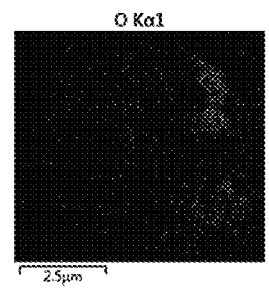
Figure 3(b)   Figure 3(c)   Figure 3(d)

METHOD FOR FABRICATION OF A HYBRID DUAL PHASE FILLER FOR ELASTOMERS

CROSS-REFERENCE TO RELATED APPLICATIONS

The present application claims priority under 35 USC 119 to Bulgarian Patent Application No. 112205 filed Jan. 28, 2016 the entire contents of which are hereby incorporated by reference.

BACKGROUND OF THE INVENTION

Field of the Invention

The invention relates to a method for fabrication of a hybrid dual phase filler for elastomers designed to find application in manufacturing technical rubber articles, such for microwave shielding, inclusive.

Background of the Invention

There is a patent document CN103055813, describing a method for producing magnetic carbon black which consists of mixing carbon black with magnetite particles in the presence of lauryl amino acid, addition of water and stirring of the suspension obtained. After reaching a certain pH the mixture is stirred again and let stay. The crude product is separated and dried till constant weight. A drawback of the method is the undescribed characteristics of the filler obtained, what makes obscure its applications.

There is a filler, known from patent FR2920918 related to manufacturing a protecting sheath for a coaxial cable. The filler contains (as a manufacturing variant) carbon black or magnetite, as well as their combination. The disadvantage of the known filler is its undescribed characteristics and its solely application, namely as a coaxial cable protecting sheath.

DISCLOSURE OF THE INVENTION

The aim of the invention is developing a method for preparation of a hybrid dual phase filler of the type carbon black/ferric oxide (magnetite) to be produced by a simplified technology and equipment using available raw sources. It also aims at ensuring an easy and precise control over the ratio of the two filler phases and over its dielectric and magnetic losses, as well as enhanced thermostability of the product.

Another aim of the invention is to obtain a hybrid dual phase filler of improved texture characteristics and good insulation of the carbon phase; of the carbon black aggregates by the magnetite one, in particular; as well as penetration of the magnetite into the very aggregates, so that the filler could be introduced directly into the rubber matrix, using the classical technology and equipment for production and vulcanization of rubber compounds, designed for manufacturing rubber items, such for microwave shielding, inclusive.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2(a) to 2(d) illustrate bright field scanning transmission electron microscopy (BF-STEM) images of a hybrid dual phase filler wherein FIG. 2(a) is obtained according to Example 1 (10% of magnetite) and composition maps of elements distribution in it; FIG. 2(b) iron; FIG. 2(c) carbon and FIG. 2(d) oxygen;

FIGS. 3(a) to 3(d) illustrate bright field scanning transmission electron microscopy (BF-STEM) images of a hybrid dual phase filler wherein FIG. 2(a) is obtained according to Example 3 (50% of magnetite) and composition maps of elements distribution in it; FIG. 3(b) iron; FIG. 3(c) carbon and FIG. 3(d) oxygen;

FIG. 4(a)×10,000; FIG. 4(b)×25,000; FIG. 4(c)×60,000 and FIG. 4(d)×400,000;

FIG. 5(a)×10,000; FIG. 5(b)×25,000; FIG. 5(c)×60,000 and FIG. 5(d)×400,000;

FIG. 6(b) 10 wt % magnetite (Example 1); FIG. 6(c) 30 wt % magnetite (Example 2); and FIG. 6(d) 50 wt % magnetite (Example 3);

FIG. 10 illustrates the frequency dependence of the attenuation coefficient α, dB/cm, of composites comprising hybrid dual fillers prepared according to the invention (N0-substrate carbon black magnetite free, N1-Example 1; N2-Example 2 and N3-Example 3;

DETAILED DESCRIPTION OF THE INVENTION

The method for preparing a hybrid dual phase filler for elastomers according to the invention involves the following sequence of the stages: impregnation of the carbon black with the ethanol suspension of magnetite in a ball mill; drying the dual phase mixture till constant weight; grinding of the dry product in the ball mill and successive thermal activation under vacuum in a reactor designed especially for the purpose. The sequence of the stages and their realization are the following:

First stage—preparation of an ethanol suspension by pouring ethyl alcohol over powered magnetite and successive homogenizing for 1 h;

Second stage—impregnation of the carbon black with the suspension obtained at the first stage and successive treatment in a ball mill for 2 h;

Third stage—ethyl alcohol decanting and drying the dual phase filler obtained at 50° C. for 2 h.

Fourth stage—drying the filler till constant weight at temperature risen to 150° C.

Fifth stage—grinding the dried product in a ball mill for 2 h.

Sixth stage—thermal activation of ground product in a reactor designed especially for the purpose at 440° C. under $10^{-2}$ mm Hg vacuum for 2 h.

Seventh stage—successive grinding of the final product in a ball mill for 2 h.

The hybrid dual phase filler obtained according to the invention comprises carbon black impregnated with an ethanol magnetite suspension, contains 5 to 50 wt. % of magnetite and 95 to 50% of carbon black. Magnetite is a powder and comprises up to 5% of $SiO_2$, its particle size is up to 50μ and density 4.8-5.2 g/cm³.

The hybrid dual phase filler obtained according to the invention has the following characteristics: specific surface area (BET) 400-900 m²/g; iodine number 370-750 mg/g; oil number 200-450 ml/100 g, micropore volume 0.03-0.15 cm³(STP)/g; micropore diameter 3-10 nm; total pore volume 0.5-1.5 cm³(STP)/g; micropore surface area 50-90 m²/g; external specific surface area 400-900 m²/g.

According to the invention, at the first stage of the method the powdered magnetite is preliminary purified towards the carbon black, so that the desired mass ration of the two phases could be achieved. The ethyl alcohol, according to the invention, is used to avoid the eventual oxidation of magnetite.

Figure 1:
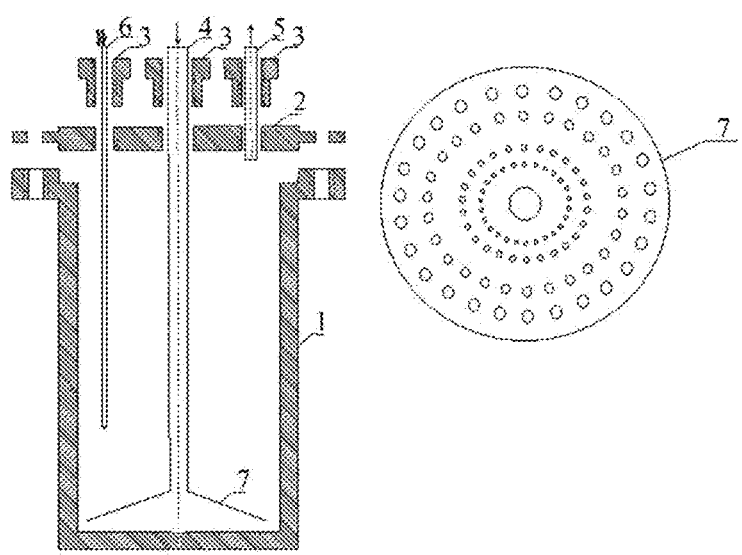
FIG. 1 illustrates the design of the reactor used.
Figure 4A:
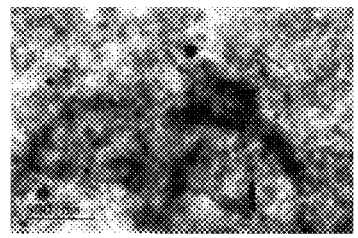
FIGS. 4(a) to 4(d) illustrate bright field transmission electron microscopy images of a hybrid filler comprising carbon and magnetite (Example 1-10% magnetite) at different magnifications.
Figure 4B:
Figure 4C:
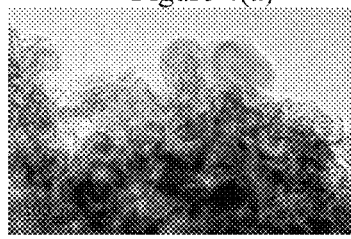
Figure 4D:
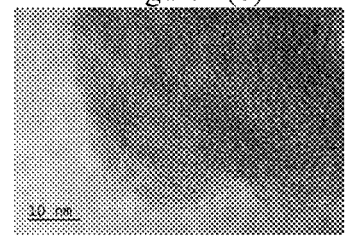
Figure 5A:
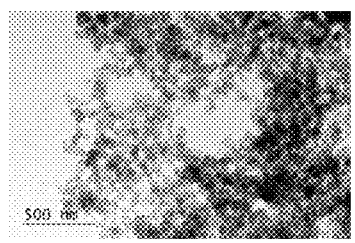
FIGS. 5(a) to 5(d) illustrate bright field transmission electron microscopy images of a hybrid filler comprising carbon and magnetite (Example 1-50% magnetite) at different magnifications.
Figure 5B:
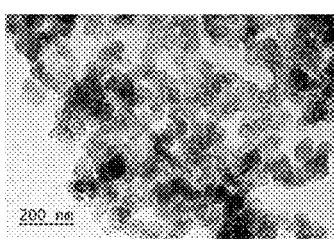
Figure 5C:
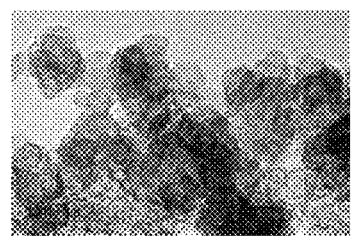
Figure 5D:
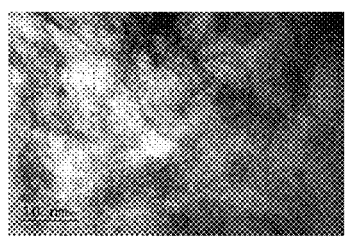
Figure 6A:
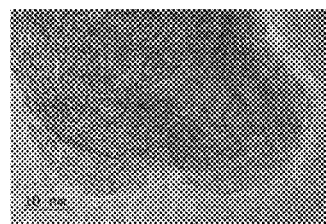
FIGS. 6(a) to 6(d) illustrate high resolution TEM images of the filler wherein FIG. 6(a) 0 wt % magnetite.
Figure 6B:
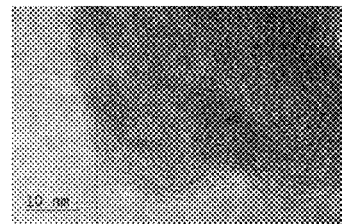
Figure 6C:
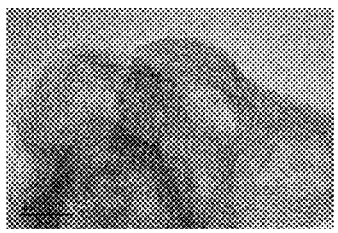
Figure 6D:
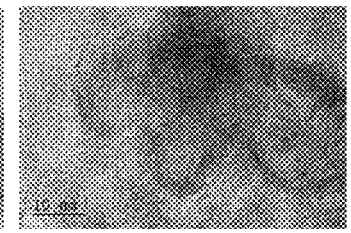

The reactor designed especially for the purpose is presented in FIG. 1.

The advantages of the method for preparation of a hybrid dual phase filler for elastomers to those known are in using thermal activation under vacuum, what ensures a considerably improved texture of the obtained dual filler. Its pores allow the magnetite phase to penetrate amongst and inside carbon black aggregates and isolate them from each other better. That prevents the oxidation processes.

Other advantages of the method according to the invention are: the possibility for an easy and precise control over the ratio of the two phases, the preliminary estimation of the impregnation agent guaranteeing defined composition of the filler, the usage of available raw materials, its simplified technology and unsophisticated equipment.

Another advantage of the hybrid dual filler obtained according to the invention is the possibility to introduce it directly into the rubber matrix implementing the classical technology for manufacturing and vulcanization of rubber compounds to be used for technical rubber items, such for microwave shielding, inclusive.

Another advantage of the filler synthesized in its further microwave shielding applications is that it facilitates preparation of a composite possessing both dielectric and magnetic losses what improves generally its microwave properties as general.

EXAMPLES

The invention is illustrated by the following examples:

Example 1

250 of ethyl alcohol were poured over 10 g of magnetite powder, particles size 44μ comprising 2.5% of $SiO_2$, density of 5.0 g/cm³. The mixture was homogenized for 1 h. The suspension obtained was poured over 90 g of conductive carbon black which was treated in a ball mill for 2 h.

Having decanted the ethyl alcohol the dual phase mixture was dried at 50° C. for 2 h, then the temperature was raised to 150° C. till reaching constant weight. The dried product was put into a ball mill and ground for 2 h. Then it was transferred into a reactor designed especially for the purpose (FIG. 1) and heated at 440° C. under vacuum of $10^{-2}$ mm Hg. The hybrid dual phase filler obtained according to Example 1 consists of 10% of magnetite and 90% of carbon black.

Example 2

The sequence of operations and technological regime are the same as in Example 1 but the amount of magnetite was 30 g and of ethanol—750 ml; the amount of conductive carbon black was 70 g. The hybrid dual phase filler obtained according to Example 2 consists of 30% of magnetite and 70% of carbon black.

Example 3

The sequence of operations and technological regime are the same as in Example 1 but the amount of magnetite is 50 g and of ethanol—1250 ml; the amount of conductive carbon black was 50 g. The hybrid dual phase filler obtained according to Example 3 consists of 50% of magnetite and 50% of carbon black.

The availability of an organic and inorganic phases in the hybrid filler obtained via the method according to the invention, at a certain ration has been proven by energy-dispersive X-ray analysis in scanning transmission electron microscopy (STEM-EDX). The bright field of scanning transmission electron microscopy (BF-TEM) reveals the contrast between the elements composing the filler, what is a result from their different atom number, thus demonstrating the available phases and their distribution. FIGS. 2 and 3 show the STEM images of the conductive carbon black/magnetite hybrid filler at different phase ratios. FIGS. 4 and 5 show BF-TEM images of the same fillers. The energy-dispersive X-ray analysis allows determining the quantity of the elements in weight percents.

As the composition maps in FIGS. 2 and 3 shown, iron and oxygen (i.e. the phase of ferric oxide) are present in the carbon phase and evenly distributed in it. Hence, the impregnation performed was successful. With increasing the amount of magnetite phase it is mapped as clusters and the higher the magnetite amount introduced during the synthesis, the larger the clusters size and higher the polydispersity.

Table 1 presents the quantities of the elements carbon, oxygen, iron and silicon in the hybrid filler according to the energy-dispersive X-ray spectroscopy (XEDS) data.

TABLE 1

Carbon, oxygen, iron and silicon content (wt. %) in the hybrid fillers at the scanned spots sown in FIGS. 2a and 3a

| Sample | Spectrum No | C, wt. % | O, wt. % | Fe, wt. % | Si, wt. % |
|---|---|---|---|---|---|
| Example 1 | 113 | 8.38 | 17.24 | 74.21 | 0.18 |
| Example 1 | 114 | 40.78 | 25.78 | 14.29 | 12.72 |
| Example 1 | 115 | 10.90 | 11.86 | 76.82 | 0.43 |
| Example 1 | 116 | 56.60 | 4.98 | 37.81 | 0.57 |
| Example 3 | 118 | 35.77 | 3.18 | 1.51 | 0.60 |
| Example 3 | 119 | 67.30 | 6.71 | 24.31 | 1.06 |
| Example 3 | 120 | 40.69 | 10.01 | 48.15 | 0.95 |
| Example 3 | 121 | 72.68 | 0.93 | 20.09 | 2.56 |
| Example 3 | 122 | 50.87 | 2.51 | 45.07 | 0.95 |

The bright field transmission electron microscopy (BF-TEM) images of the same fillers are presented in FIGS. 4 and 5.

The results above prove doubtlessly that, the hybrid carbon black/magnetite dual phase filler has been obtained by the method according to the invention. It is also seen that, the magnetite phase is distributed in the carbon one inter- and intra-aggregately. The bright fields in the figures correspond to the carbon phase, while the dark ones to the magnetite phase. The TEM images of high resolution (×400,000) in FIG. 6 are another proof that the dual phase hybrid fillers have been obtained by the method according to the invention.

As seen from FIG. 6, the structure of the carbon phase is the most ordered in the absence of magnetite: the concentric microstructure is the best developed and the size of spherulites is the largest (about 60 nm). The structure is compact and densely packed. The presence of a magnetite phase and the increase in its amount lead to shrinking of the spherulites and distortion of the concentric microstructure. In some cases, as in FIG. 6d, the carbon black lacks any orderness, there are dark and very bright domains what gives grounds to the supposition that, at higher concentrations the magnetite phase penetrates into the carbon one and insulates the carbon black aggregates. The fact is of great importance for the microwave properties of the composites comprising that type of hybrid filler. Meanwhile that is an advantage provided by the method for preparing such fillers according to the invention.

The results presented in FIGS. 2-6 prove that the magnetite particles are present in the hybrid dual phase filler indeed. In most cases they are distributed over the surface of carbon black aggregates insulating them, in some cases magnetite particles have even penetrated the aggregates. The filler thus obtained guarantees the composites comprising it both high magnetic and dielectric losses. That is an important advantage regarding the composites microwave applications.

The thermostability and oxidation resistivity characterization of the hybrid dual fillers prepared according to the invention was performed by differential thermal analysis (DTA) and thermogravimetric analysis (TGA). The results obtained are presented in Table 2.

TABLE 2

Characteristics of the hybrid fillers according to DTA И TGA data

| Characteristic | CCB | Example 1 | Example 2 | Example 3 |
|---|---|---|---|---|
| Beginning of losses in bulk, ° C. | 330 | 355 | 379 | 410 |
| Losses in bulk at 1000° C., % | −98 | −80 | −64 | −44 |
| Temperature of oxidation at a maximum rate, ° C. | 430 | 440 | 460 | 510 |
| Temperature of complete combustion, ° C. | 550 | 560 | 584 | 599 |

With increasing the amount of magnetite phase the fillers get less reactive. Therefore higher temperature is required for the oxidation to proceed at maximum rate, while their losses in bulk lessen. Another advantage according to the invention is that, the hybrid fillers have thermal stability higher than that of substrate carbon black.

The hybrid filler obtained according to the invention could be used for developing composites based on natural and synthetic elastomers which find application in the rubber industry for producing technical rubber articles, such for microwave application, inclusive.

The hybrid filler obtained according to the invention has better insulation of the conductive carbon black clusters and ensures possibility to achieve the right ration of the components. Besides the higher thermostability the filler comprises phases with both high dielectric and magnetic losses what makes it applicable in the production of rubber items for microwave shielding.

The rubber compounds comprising the hybrid filler obtained according to the invention were prepared in an open two-roll mill (L/D 320×160 and friction 1.27). The speed of the slow roll was 25 min$^{-1}$.

Preparation of the compounds involved plasticization of the rubber on the rolls for 6 min prior to ingredients introduction.

According to the invention, after the plasticization zinc oxide, stearic and one third of the dual phase filler were added at the 6$^{th}$ minute. Then the second third of the dual filler was added at the 15$^{th}$ and the third one—at the 20$^{th}$ minute. Sulfur and the accelerator were added at the end. When the rubber matrix absorbed the ingredients, the compound was cut diagonally and the strip was crossed at the opposite end of the roll. The compound was coiled and passed through a narrow nip. The ready compound was taken off the rolls in the form of a sheet at the 25$^{th}$ minute and let stay for 24 hours prior to its vulcanization.

The vulcanization was carried out on an electrically heated hydraulic press using a special homemade mold at 150° C. and under pressure of 10 Mpa at the vulcanization optimums determined for each compound on an oscillating disc vulcameter. The composition of the studied rubber compounds comprising the fillers prepared according to Examples 1-3 of the invention are summarized in Table 3.

TABLE 3

Composition of the studied rubber compounds comprising fillers prepared according to Examples 1-3 (in pmh regarding 100 mass % of rubber)

| | Ingredients | N0 | N1 | N2 | N3 |
|---|---|---|---|---|---|
| 1. | NR (SMR-10) | 100 | 100 | 100 | 100 |
| 2. | Stearic acid | 2 | 2 | 2 | 2 |
| 3. | Zinc oxide | 3 | 3 | 3 | 3 |
| 4. | CCB/M-0/without magnetite/ | 70 | — | — | — |
| 5. | CCB/M-10 | — | 70 | — | — |
| 6. | CCB/M-30 | — | — | 70 | — |
| 7. | CCB/M-50 | — | — | — | 70 |

TABLE 3-continued

Composition of the studied rubber compounds comprising fillers prepared according to Examples 1-3 (in pmh regarding 100 mass % of rubber)

| Ingredients | N0 | N1 | N2 | N3 |
|---|---|---|---|---|
| 8. TBBS[1] | 1.5 | 1.5 | 1.5 | 1.5 |
| 9. Sulfur | 2 | 2 | 2 | 2 |

[1]N-tert-butyl-2-benzothiazolesulfenamide

Figure 7:
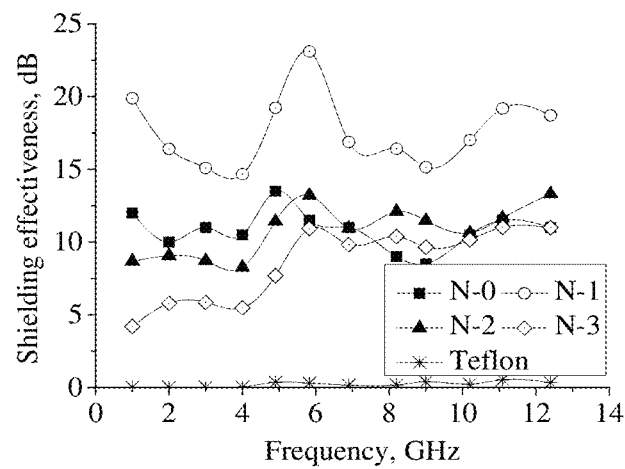
FIG. 7 illustrates the frequency dependence of the total shielding effectiveness of composites comprising hybrid dual fillers prepared according to the invention (N0-substrate carbon black magnetite free; N1-Example 1; N2-Example 2 and N3-Example 3.
Figure 8:
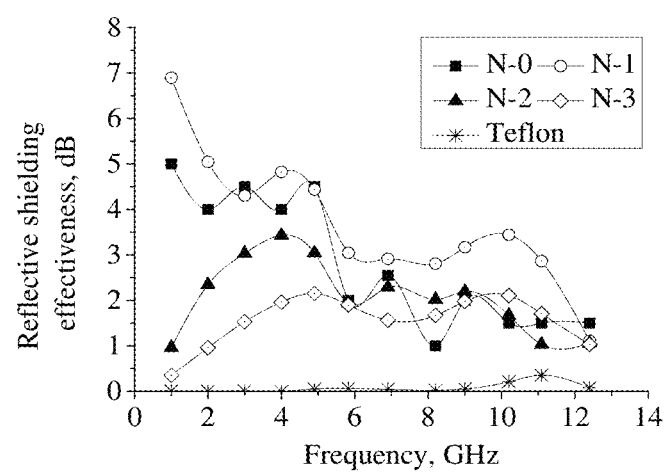
FIG. 8 illustrates the frequency dependence of the total shielding effectiveness at reflection of composites comprising hybrid dual fillers prepared according to the invention (N0-substrate carbon black magnetite free; N1-Example 1; N2-Example 2 and N3-Example 3.
Figure 9:
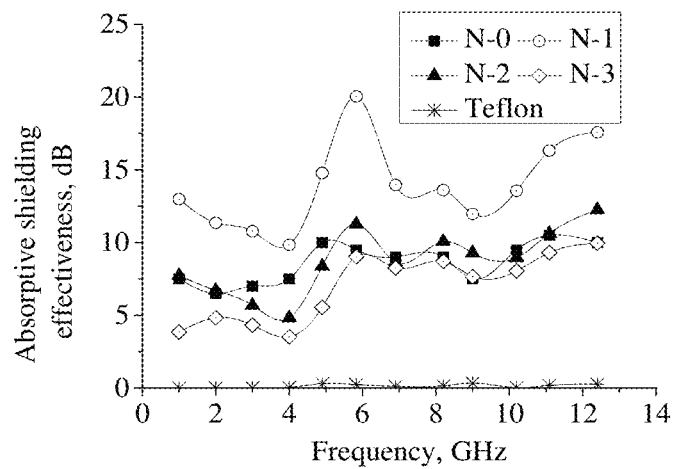
FIG. 9 illustrates the frequency dependence of the total shielding effectiveness at absorption of composites comprising hybrid dual fillers prepared according to the invention (N0-substrate carbon black magnetite free, N1-Example 1; N2-Example 2 and N3-Example 3.

The microwave properties of the elastomer based composites comprising hybrid dual fillers prepared according to Examples 1-3 of the invention, as well as those of the substrate carbon black (given for comparison) are shown in FIGS. 7-9.

As seen, in the entire frequency range the composite with a hybrid filler prepared according to Example 1 exhibits very good shielding properties—its total shielding effectiveness is in the 14.7 dB to 23.1 dB range. That means the power of the incident wave will be subjected to attenuation of 30 to 200 times. As the figures show, at the same thickness of the specimens, the effectiveness of composite N1 surpasses considerably that of the control magnetite free sample N0. In the entire frequency range Teflon does not exhibit shielding properties. As expected its shielding effectiveness tends to zero.

Figure 10:
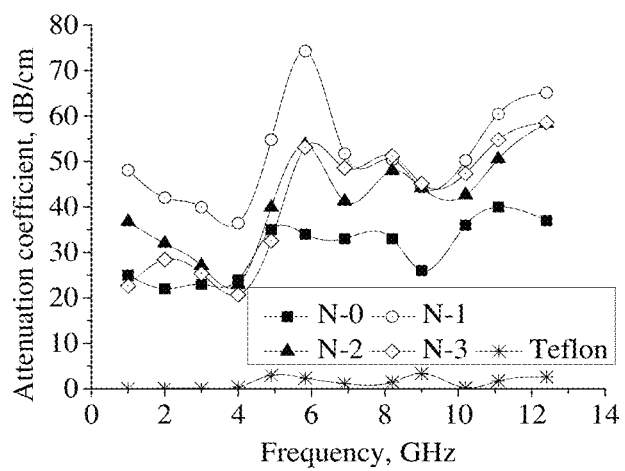
Figure 11:
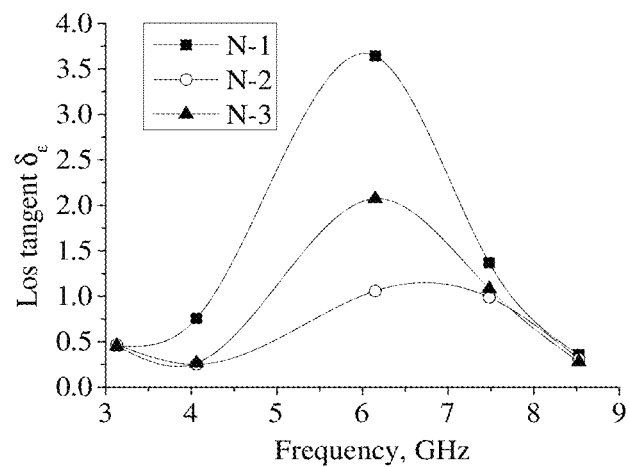
FIG. 11 illustrates the frequency dependence of the tangent of dielectric loss angle tan $\delta_\varepsilon$ of composites comprising hybrid dual fillers prepared according to the invention (N0-substrate carbon black magnetite free, N1-Example 1; N2-Example 2 and N3-Example 3.
Figure 12:
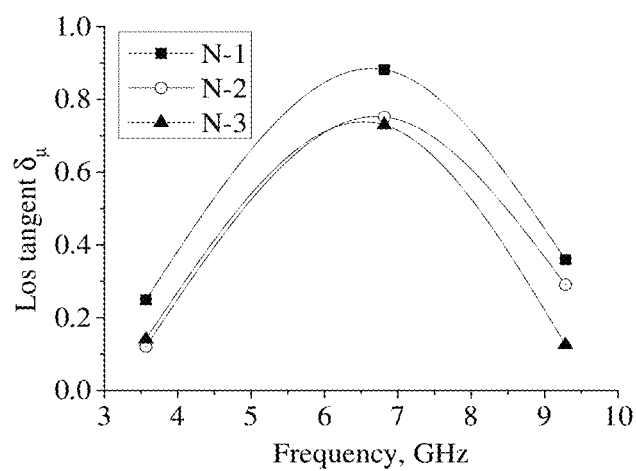
FIG. 12 illustrates the frequency dependence of the tangent of dielectric loss angle tan $\delta_\mu$ of composites comprising hybrid dual fillers prepared according to the invention (N0-substrate carbon black magnetite free, N1-Example 1; N2-Example 2 and N3-Example 3.

The good microwave properties of the composites comprising hybrid dual fillers prepared according to the invention are proven by the results from the measurements on the coefficient of electromagnetic waves attenuation, as well as on the tangent of dielectric and magnetic losses (FIGS. 10-12).

As seen from the figures, the composite comprising a hybrid dual filler prepared according to Example 1 of the invention has the highest values for the tangent of dielectric and magnetic loss angle, attenuation coefficient (75 dB/cm) and t total effectiveness of electromagnetic shielding (15-25 dB) in the entire frequency range. That opens opportunity to use the composite for microwave applications. Its good properties could be explained by the availability of two phases in the hybrid filler: carbon black possessing high dielectric loss, while magnetite has high magnetic loss. That is one of the major advantages of the fillers obtained according to the inventions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for fabrication of a hybrid dual phase filler for elastomers based on carbon black and magnetite has been elaborated, the filler includes the carbon black impregnated with ethanol suspension of magnetite in a ball mill, then the dual phase mixture is dried till a constant weight, thereafter the dried product is ground in a ball mill, thermally activated in a reactor designed especially for the purpose, at the end the final product is ground again in a ball mill, the method includes the following steps:

first stage—preparing the ethanol suspension by pouring ethyl alcohol over powder magnetite and successive homogenizing for 1 h;

second stage—impregnating carbon black with the suspension obtained at the first stage and successive treatment in a ball mill for 2 h;

third stage—decanting ethyl alcohol and drying of the obtained dual phase filler at 50° C. for 2 h;

fourth stage—drying till constant weight at temperature risen to 150° C.;

fifth stage—grinding the dried product in a ball mill for 2 h;

sixth stage—thermal activation in a reactor designed especially for the purpose at 440° C. under $10^{-2}$ mm Hg vacuum for 2 h; and seventh stage—grinding of the final product in a ball mill for 2 h.

2. A dual phase filler made according to the method of claim 1 comprising carbon black impregnated with ethanol suspension of magnetite, which contains 5 to 50 mass % of magnetite and 95 to 50 mass % of carbon black.

3. A dual phase filler for elastomers made according to the method of claim 1 wherein magnetite being a powder comprising up to 5% of $SiO_2$, particles size up to 50 μ and density of 4.8-5.2 g/cm$^3$.

4. A dual phase filler made according to the method of claim 1 having the following properties: specific surface area (BET/) 400-900 m$^2$/g; iodine number —370-750 mg/g; oil number 200-450 ml /100g; total pore volume—0,5-1,5 cm$^3$(STP)/g; micropore surface area 50-90 m$^2$/g; external specific surface area 400-900 m2/g.

* * * * *